United States Patent

Massa

[11] 4,103,309
[45] Jul. 25, 1978

[54] AUTOMATIC CAMERA FOCUSING MEANS

[75] Inventor: Frank Massa, Cohasset, Mass.

[73] Assignees: Fred M. Dellorfano, Jr.; Donald P. Massa, both of Cohasset, Mass. ; Trustees of The Stoneleigh Trust

[21] Appl. No.: 685,429

[22] Filed: May 11, 1976

[51] Int. Cl.² ............................................. G03B 7/08
[52] U.S. Cl. ...................................... 354/25; 352/140
[58] Field of Search ........................... 354/25; 352/141

[56] References Cited

U.S. PATENT DOCUMENTS

| | | | |
|---|---|---|---|
| 3,185,052 | 5/1965 | Baron | 352/141 |
| 3,274,913 | 9/1966 | Biedermann | 354/25 |
| 3,723,003 | 3/1973 | Vockenhuber | 352/141 |
| 3,871,756 | 3/1975 | Stieringer | 354/25 |

Primary Examiner—Monroe H. Hayes

[57] ABSTRACT

A movie camera is provided with an automatic focusing adjustment mechanism which is responsive to a control signal which is generated by an ultrasonic range finder attached to the camera. The camera is automatically kept in focus as the distance of the subject from the camera is varied.

2 Claims, 3 Drawing Figures

AUTOMATIC CAMERA FOCUSING MEANS

This invention is concerned with automatic means for maintaining the correct focus in a camera as the distance between the camera and the subject being photographed is varying. Although this invention is not limited to motion picture cameras it is particularly useful when it is applied to a motion picture camera because it will improve the sharpness of the recorded image on the film as the subject being photographed is changing distance from the camera. In order to automatically control the focus adjustment the camera is provided with a range measurement system that generates a signal which corresponds to the distance between the camera and the subject being photographed and the generated signal is used to control the focus adjustment mechanism.

The primary object of this invention is to automatically control the focus of a camera so that the camera is always correctly focused on the subject being photographed while the distance between the subject and the camera is changing.

Another object of the invention is to employ an electroacoustic transducer and its associated circuit as an echo ranging system for the continuous measurement of the distance between the camera and the subject and to use the distance information to control the camera focusing mechanism to keep the camera always in focus while the distance between the camera and the subject is varied.

Still another object of the invention is to attach a directional ultrasonic transducer to a camera with the axis of the transducer held parallel to the axis of the lens and to use the ultrasonic transducer in a sound ranging system for measuring the distance between the camera and subject. The range measurement data is then used to automatically adjust the camera focus to correspond to the distance of the subject before the camera.

A still further object of this invention is to use a directional ultrasonic transducer in combination with an automatic camera focusing system. The transducer is utilized in an echo ranging system for measuring the distance to the subject from the camera. The main beam of the transducer is the predominant beam in the pattern of the transducer and the secondary beams have sensitivities which are of the order of 10% or less than the main beam sensitivity in order that the presence of subjects located off the main axis of the camera are not detected by the transducer.

The novel features which are characteristic of this invention are set forth with particularity in the appended claims. The invention itself, however, both as to its method of operation as well as additional objects and advantages thereof will be best understood by reference to the following description taken in conjunction with the accompanying drawings in which:

Figure 1:
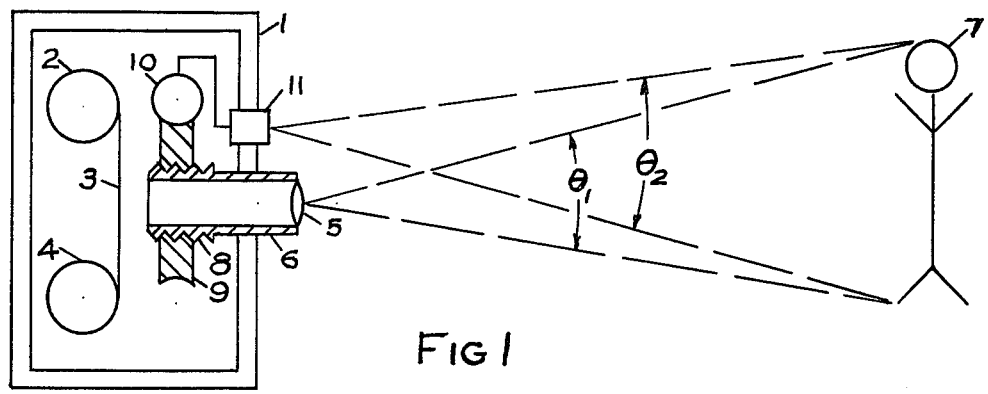
FIG. 1 is a schematic view of a motion picture camera which illustrates an application of the automatic self-focusing system disclosed in this invention.

Referring more particularly to the Figs., the reference character 1 illustrates the outer housing portion of a conventional optical camera which may be either a still camera or a motion picture camera. A spool 2 contains a strip of film 3 which is threaded through the conventional sprocket film transport system which is not illustrated in the drawing as it is a well known part of a conventional camera system and does not form a part of this invention. A take-up spool 4 is illustrated which stores the exposed film after it is exposed and transferred from the supply spool 2 in the conventional manner. For a still camera the film is transported one frame at a time after successive exposures of individual scenes whereas for a motion picture camera the film is transported continuously at a rate of several frames per second by driving the sprocket wheel from an electric motor or a spring motor in the conventional manner as is well known in the art.

The camera has a conventional lens system illustrated by the lens 5 which is on one end of a cylindrical barrel 6 which is slidably mounted to the main housing structure 1 so that its axial position may be varied as desired for changing the distance between the lens and the film as is necessary for focusing the image of the subject 7 onto the surface of the film 3. The axial motion of the lens is accomplished by the schematically illustrated mechanical system which includes a threaded body portion 8 over the outer surface of the cylindrical barrel 6 as illustrated. A captive nut 9 engages the threaded portion of the barrel 6 so that rotation of the nut 9 results in axial displacement of the lens system to permit focusing the image of the subject onto the film as desired.

For a conventional camera the position of the lens is set by manually turning the nut to correspond to the desired position necessary to focus the image on the film for the particular distance from the camera lens of the subject being photographed.

In Applicant's invention automatic means is provided for setting the distance of the lens from the film so that the correct distance is maintained to keep the image in focus at all times as the distance of the subject from the camera changes. An illustration of one embodiment of Applicant's automatic focusing system is schematically illustrated in the figures. The outer periphery of the nut 9 is machined in the form of a gear which for the illustrative case is a worm gear. A mating worm gear 10 is mounted so that it operatively engages the periphery of the nut 9. The rotation of the worm is operated by an electrically controlled drive system which is actuated by control signals generated by the range measurement transducer 11.

Figure 2:
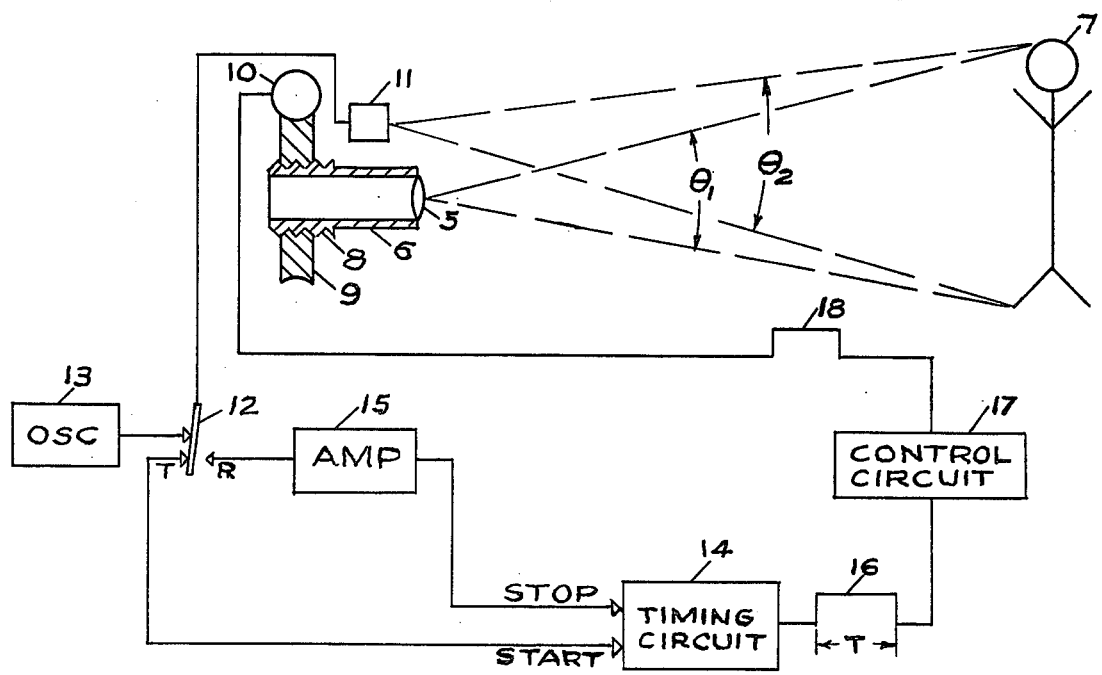
FIG. 2 is a more detailed schematic view of the automatic range measurement and focusing adjustment portions of the system illustrated in FIG. 1.

In one preferred embodiment of this invention the transducer 11 is a directional ultrasonic transducer which is operated as illustrated in FIG. 2 as an echo ranging distance measurement system such as is conventionally done in underwater sonar systems for the detection of submarines, or for the measurement of the depth of water beneath a ship. A Transmit-Receive switch schematically illustrated by 12 in FIG. 2 is utilized to operate the ultrasonic echo ranging system to make continuous distance measurements between the lens and the subject being photographed. The procedure for generating a focusing control signal which is proportional to the distance of the subject 7 from the lens is as follows: The switch 12 is connected to terminal T for a brief instant (generally in the order of a millisecond more or less) during which time the output from an oscillator 13 is applied to the transducer 11 which generates a tone burst of sound. At the instant of connecting the switch 12 to terminal T a timing circuit 14 is started. After the tone burst of sound is initiated by the switch 12 being momentarily connected to the position T, the switch 12 is immediately transferred to the position R which serves to connect the transducer 11 in the receive mode. When the transmitted tone burst signal is reflected back to the camera from the subject 7 it is picked up by the transducer 11 and the received signal is amplified by the amplifier 15. At the instant of the appearance of the received signal at the amplifier output the signal is utilized to stop the timing circuit 14 thereby establishing a reference time signal 16 illustrated as a dc pulse of time duration T which is representative of the transit time for the ultrasonic signal to travel the round trip distance between the transducer 11 and the subject 7 and, therefore, represents the range or distance of the subject from the camera.

The range measurement signal 16 is applied to a control circuit 17 which continually compares the magnitude of the range signal 16 to the magnitude of a reference signal 18 which is derived from the rotational position of the nut 9 and therefore is representative of the focus setting of the lens. Details of the electronic system schematically indicated are not shown because they are well known in the art and do not in themselves form a part of this invention. This invention is only concerned with the novel combination of well known echo ranging systems and time comparison circuits to achieve an automatic self-focusing system which automatically keeps the recorded image of a subject in continuous focus as the distance of the subject is changing. A conventional motor drive system, not shown in the drawings, is used to drive the worm 10 in one direction or the other depending on whether reference signal 18 is greater or less than the range measurement signal 16 and the drive motor is automatically stopped when the two signals are equal thus achieving the instant automatic focusing of the image recording system and thereby accomplishing the object of this invention. Neither the details of the motor drive system nor the details of the method for generating the reference signal 18 are shown in the drawings because they are very well known to anyone skilled in the art and these details do not in themselves form a part of this invention.

Some of the conditions that must be met by the transducer 11 in order to improve the reliability of the inventive self-focusing system will be described. Referring to FIGS. 1 and 2 the subject 7 being photographed is shown totally framed within the lens angle $\theta_1$. It is preferable to use a transducer 11 which has a directional sensitivity pattern in which the transducer beam angle $\theta_2$ is equal to or less than the lens angle $\theta_1$. If the transducer directional sensitivity covered a wider beam angle, reflections of signals from objects located outside the angle $\theta_1$ would also be intercepted by the transmitted ultrasonic sound pulse from the transducer and the returned echo from the objects outside the field of view of the lens would return earlier if the objects were at a closer distance than the subject being photographed which would result in the wrong focusing distance being established by the system.

Figure 3:
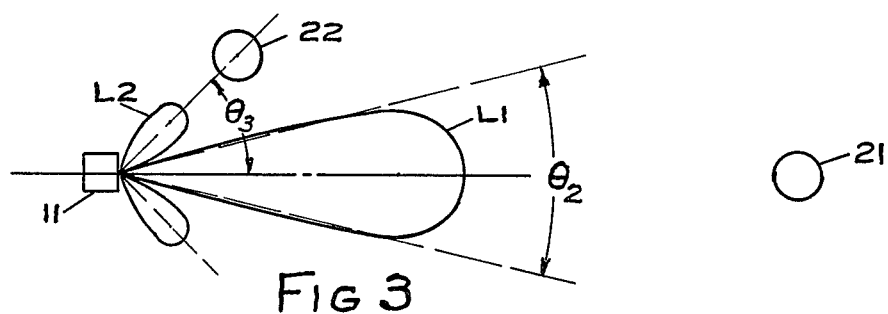
FIG. 3 is a polar diagram showing the preferred beam pattern of the ultrasonic transducer employed in a preferred embodiment of the self-focusing system disclosed in this invention.

Another important requirement for the directional beam pattern characteristic is that the secondary lobe sensitivity be as low as possible in comparison to the on-axis sensitivity of the main beam. A conventional beam pattern characteristic for a directional ultrasonic transducer is illustrated in FIG. 3 which is a plot of the transducer sensitivity as a function of the angle from the normal axis of the transducer. The maximum sensitivity occurs along the main axis as shown. The magnitude of the angle $\theta_2$ which includes the main beam is a function of the diameter of the transducer and the frequency of operation as is well known in the art. For a conventional transducer employing a circular vibrating piston as the active sound radiating element a secondary lobe L2 occurs at an angle $\theta_3$ along which a secondary maximum transducer sensitivity takes place. The secondary lobe L2 is a surface of revolution about the main axis for a conventional transducer employing a circular piston for the sound radiating surface. The secondary sensitivity maximum which occurs along the axis $\theta_3$ for a conventional transducer is approximately 1/7 the sensitivity along the main axis of the primary lobe L1. If such a transducer is employed in this invention, it is possible for errors to occur in the automatic focusing adjustment. For example, if the camera is trained on the subject 21 in FIG. 3 which is located, for example, 15 ft. from the camera, the lens focusing mechanism will set the lens to correctly focus the subject provided that no other objects are located closer to the camera along the axis of the secondary lobe $\theta_3$. If, however, an object 22 is located as illustrated in FIG. 3 along the axis $\theta_3$ and its distance, for example, is 2 ft. from the camera, the secondary sound pulse which is transmitted along the secondary lobe L2 will be reflected from the object 22 and the echo will be received by L2 before the return of the echo from the subject 21. Due to the closer distance of the object 22 the returned secondary echo will be correspondingly increased and will compensate for the reduced sensitivity of the transducer along its axis $\theta_3$. As a result the focusing system will respond to the reflection from the object 22 and focus the lens for the 2 ft. distance of the object instead of the 15 ft. distance of the subject 21. To avoid such an error in the system it is preferable to utilize a transducer whose secondary lobe response is reduced from that of the conventional transducer. I have found that satisfactory operation can be achieved if the secondary lobe sensitivity is less than approximately 7% of the maximum on-axis sensitivity of the transducer. A suitable ultrasonic transducer for this application is described in U.S. Pat. No. 3,928,777.

Although the illustrative example described for this invention employed a motion picture camera, it is obvious that other image recording systems can make use of the teachings of this invention. For example, the invention may be applied to a TV recording system where the camera image is converted to electronic signals and recorded on magnetic tape instead of on photographic film. It is also obvious that other forms of energy radiating systems can be substituted for the ultrasonic echo ranging system described in the illustrative example of the invention. For example, a high frequency radar system can be used for measuring the distance to the subject. Such a system would become more expensive, however, especially for getting precise measurements for close-up distances of the subjects. A laser beam could also be used for determining the distance of the subject and it would also be more expensive than the ultrasonic system.

The specific details of the several alternate means which may be employed in carrying out the teachings of this invention have not been described because they are all well known in the art and they do not in themselves form a part of this invention. This invention is concerned only with the new combination of these well known elements for the purpose of achieving automatic focusing for an image recording system such as a motion picture camera, for example, so that the focus of the image being recorded is always correctly maintained as the distance of the subject from the camera is changed.

Several specific embodiments of this invention have been illustrated and described and it will be obvious to one skilled in the art that additional modifications may be made without departing from the true spirit and scope of the invention; therefore, the appended claims are intended to cover all equivalents that will fall within the true spirit and scope of this invention.

I claim:

1. In combination in a photographic camera, a lens characterized in that its field of view is defined by the angle $\theta_1$, a directional electroacoustic transducer characterized in that its main beam angle is defined by the angle $\theta_2$, means for attaching said transducer to said camera with the axis of maximum sensitivity of said transducer mounted parallel to the axis of said lens, said transducer further characterized in that its beam angle $\theta_2$ is not greater than $\theta_1$, a first electrical circuit means for operating said electroacoustic transducer as an echo-ranging system and generating a first reference electrical signal which varies as a function of the distance between the transducer and the subject toward which the lens is facing, a second electrical circuit means for generating a second reference electrical signal which varies as a function of the focus setting position of the lens, automatic focus-adjusting means including an electrically-operated drive system adapted for adjusting the position of said lens, control signal means for operating said automatic focus-adjusting means, means for continually comparing said first and said second reference signals, said signal comparison means characterized in that said control signal is generated whenever said first and said second reference signals are not equal, said electrically-operated drive system characterized in that it is responsive to said control signal, whereby said electrically-operated drive system is activated to adjust the position of said lens until said first and second reference signals are equal, whereby said lens is automatically kept in focus on the subject toward which the lens is facing, and further characterized in that the beam angle of said electroacoustic transducer lies within the approximate range 10° to 30°.

2. In combination in a photographic camera, a lens characterized in that its field of view is defined by the angle $\theta_1$, a directional electroacoustic transducer characterized in that its main beam angle is defined by the angle $\theta_2$, means for attaching said transducer to said camera with the axis of maximum sensitivity of said transducer mounted parallel to the axis of said lens, said transducer further characterized in that its beam angle $\theta_2$ is not greater than $\theta_1$, a first electrical circuit means for operating said electroacoustic transducer as an echo-ranging system and generating a first reference electrical signal which varies as a function of the distance between the transducer and the subject toward which the lens is facing, a second electrical circuit means for generating a second reference electrical signal which varies as a function of the focus setting position of the lens, automatic focus-adjusting means including an electrically-operated drive system adapted for adjusting the position of said lens, control signal means for operating said automatic focus-adjusting means, means for continually comparing said first and said second reference signals, said signal comparison means characterized in that said control signal is generated whenever said first and said second reference signals are not equal, said electrically-operated drive system characterized in that it is responsive to said control signal, whereby said electrically-operated drive system is activated to adjust the position of said lens until said first and second reference signals are equal, whereby said lens is automatically kept in focus on the subject toward which the lens is facing, and further characterized in that the magnitude of the secondary lobes in the directional pattern of said electroacoustic transducer are reduced in sensitivity in comparison with the sensitivity along the main axis of the transducer by a ratio at least as great as 10 to 1.

* * * * *